US008275914B2

(12) United States Patent
Kim et al.

(10) Patent No.: US 8,275,914 B2
(45) Date of Patent: Sep. 25, 2012

(54) DISCOVERY OF CONNECTIONS UTILIZING A CONTROL BUS

(75) Inventors: Jason Seung-Min Kim, San Jose, CA (US); Inyeol Lee, Saratoga, CA (US); Shrikant Ranade, Campbell, CA (US); Daeyun Shim, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 206 days.

(21) Appl. No.: 12/577,707

(22) Filed: Oct. 12, 2009

(65) Prior Publication Data

US 2010/0100200 A1    Apr. 22, 2010

Related U.S. Application Data

(60) Provisional application No. 61/106,120, filed on Oct. 16, 2008.

(51) Int. Cl.
*G06F 3/00* (2006.01)
(52) U.S. Cl. ............................. 710/15; 710/16
(58) Field of Classification Search ........................ None
See application file for complete search history.

(56) References Cited

U.S. PATENT DOCUMENTS

| | | | | |
|---|---|---|---|---|
| 6,593,768 B1 * | 7/2003 | Iyer et al. | | 326/30 |
| 6,615,301 B1 * | 9/2003 | Lee et al. | | 710/106 |
| 6,718,415 B1 * | 4/2004 | Chu | | 710/301 |
| 6,813,654 B1 * | 11/2004 | Ishibashi | | 710/36 |
| 6,907,492 B2 * | 6/2005 | Matsuda et al. | | 710/313 |
| 7,099,981 B2 * | 8/2006 | Chu | | 710/301 |
| 7,146,446 B2 * | 12/2006 | Chu | | 710/301 |
| 7,328,297 B2 * | 2/2008 | Chu | | 710/301 |
| 7,363,415 B2 * | 4/2008 | Chu | | 710/313 |
| 7,363,416 B2 * | 4/2008 | Chu | | 710/313 |
| 7,376,779 B2 * | 5/2008 | Chu | | 710/313 |
| 7,711,865 B2 * | 5/2010 | Kim et al. | | 710/8 |
| 7,711,870 B2 * | 5/2010 | Yoshida et al. | | 710/16 |
| 7,788,428 B2 * | 8/2010 | Melin | | 710/62 |

(Continued)

FOREIGN PATENT DOCUMENTS

EP            0639916 A2      2/1995

(Continued)

OTHER PUBLICATIONS

*Invitation to Pay Additional Fees* mailed Jan. 26, 2010 for International Application No. PCT/US2009/060685.

(Continued)

*Primary Examiner* — Henry Tsai
*Assistant Examiner* — Titus Wong
(74) *Attorney, Agent, or Firm* — Blakely Sokoloff Taylor Zafman LLP

(57) ABSTRACT

Discovery of connections utilizing a control bus. An embodiment of a method includes detecting a transition of a control bus from a high state to a low state by a source device, the source device being configured to be coupled with a sink device via an interface, the interface including the control bus, the source device including a pullup device and the sink device including a pulldown device; pulsing the control bus to a high state at the source device; and upon detecting by the source device that the control bus remains in the high state ceasing the pulsing of the control bus to the high state, and transitioning the source device from a disconnected state to a connected state.

21 Claims, 8 Drawing Sheets

U.S. PATENT DOCUMENTS

| | | | |
|---|---|---|---|
| 7,805,553 B2 * | 9/2010 | Kasahara et al. | 710/62 |
| 2002/0196611 A1 | 12/2002 | Ho et al. | |
| 2006/0075152 A1 | 4/2006 | Zhu | |
| 2009/0248924 A1 | 10/2009 | Melin | |

FOREIGN PATENT DOCUMENTS

| | | |
|---|---|---|
| EP | 1632864 A2 | 3/2006 |

OTHER PUBLICATIONS

*International Search Report and the Written Opinion of the International Searching Authority* mailed Apr. 15, 2010, PCT/US2009/060685.

International Preliminary Report on Patentability for International Application No. PCT/US2009/060685, mailed Apr. 28, 2011.

* cited by examiner

DISCOVERY OF CONNECTIONS UTILIZING A CONTROL BUS

RELATED APPLICATION

This patent application is related to and claims priority to U.S. provisional patent application No. 61/106,120, filed Oct. 16, 2008.

TECHNICAL FIELD

Embodiments of the invention generally relate to the field of networks and, more particularly, to a method and apparatus for discovery of connections utilizing a control bus.

BACKGROUND

Multiple electronic devices are increasingly connected together to communicate. In one example, entertainment and multi-media devices may be interconnected to transfer or share digital information. The connection of such devices generally requires some form of standard bus or interface to allow the devices to easily connect and communicate with each other.

In one example, the HDMI™ (High-Definition Multimedia Interface) provides an interface that allows for the transfer of uncompressed digital high-definition video and audio, together with associated control signals. (HDMI is a trademark of HDMI Licensing, LLC.) HDMI includes the High-Definition Multimedia Interface 1.4 (Hitachi, Ltd., Matsushita Electric Industrial Co., Ltd., Philips Consumer Electronics, International B.V., Silicon Image, Inc., Sony Corporation, Thomson Inc., and Toshiba Corporation) (May 28, 2009) and High-Definition Multimedia Interface 1.3 (Jun. 22, 2006), as well as earlier and later versions of HDMI. Multimedia devices may include any devices capable of providing, storing, or displaying multimedia data, including television monitors, cable and satellite set-top boxes, video players, including DVD (Digital Versatile Disk), HD (High-Definition) DVD, and Blu-Ray players, audio players, digital video recorders, and other similar devices. HDMI devices utilize TMDS™ (Transition Minimized Differential Signaling) technology. TMDS encoding converts 8 bits per TMDS data channel into a 10-bit DC-balanced, transition minimized sequence, which is then transmitted serially across the pair at a rate of 10 bits per TMDS clock period. An HDMI connection may include a DDC (Display Data Channel) for configuration and status exchange between a source device and a sink device, and an optional CEC (Consumer Electronics Control) protocol to provide high-level control functions among audiovisual products in a user's environment.

However, the types of electronic devices that are capable of holding and utilizing large quantities of digital data have expanded as the memory capacity and processing power of devices has risen. Such media devices may be mobile or handheld. However, a mobile device may utilize a different type of connection than a standard device because of the smaller physical size. If various types of devices need to exchange data such as media data, a device that is transmitting or receiving such data may be required to identify the type of device or devices that are involved in the data transfer.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
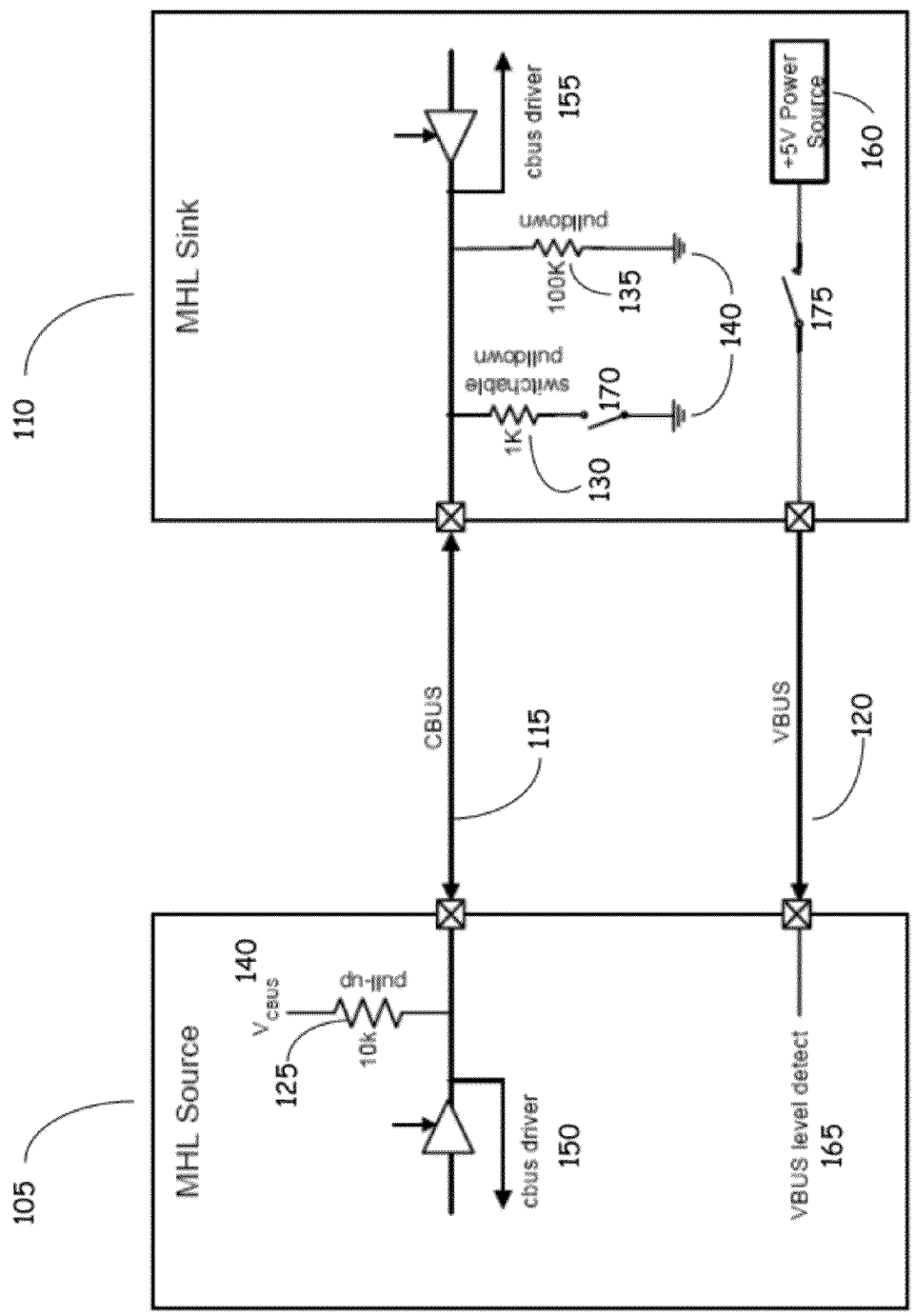
FIG. 1 illustrates an embodiment of detection of connections utilizing a control bus.

Embodiments of the invention are generally directed to discovery of connections utilizing a control bus.

In a first aspect of the invention, an embodiment of a method includes detecting a transition of a control bus from a high state to a low state by a source device, the source device being configured to be coupled with a sink device via an interface, the interface including the control bus, where the source device includes a pullup device and the sink device includes a pulldown device. The method further includes pulsing the control bus to a high state at the source device, and, upon detecting by the source device that the control bus remains in the high state, ceasing the pulsing of the control bus to the high state and transitioning the source device from a disconnected state to a connected state.

In a second aspect of the invention, an embodiment of method includes pulling a control bus potential to a low state at a sink device by a pulldown device of the sink device, the sink device being configured to be coupled with a source device via an interface, where the interface includes the control bus and the source device includes a pullup device. The method further includes detecting a high state of the control bus at the sink device, disconnecting the pulldown device in response to the detection of the high state on the control bus by the sink device, and transitioning the sink device to a connected state.

DETAILED DESCRIPTION

Embodiments of the invention are generally directed to discovery of connections utilizing a control bus.

As used herein:

"Mobile device" means any mobile electronic device. The term "mobile device" includes, but is not limited to, a cellular telephone, smartphone, PDA (personal digital device), MP3 or other format music player, digital camera, video recorder, digital storage device, and other similar devices.

In some embodiments, a system provides an interface to connect a mobile device to other devices. In some embodiments, a mobile device utilizes a modified protocol to allow connection with other devices, which devices may utilize a standard protocol. In some embodiments, a standard device is a dual- or multiple-mode device that utilizes a control bus at least in part to discover what type of device is attached to the standard device.

In some embodiments, a system or method provides for detecting a connection between a sink device or element (which receives data) and a source device or element (which is a source of the data). In some embodiments, a system or method provides a means of distinguishing such connection from other possible connections to the source device.

In a particular embodiment, data being transferred between devices may be multimedia data and associated commands, including a stream of HDMI data and commands. For example, a mobile device containing high-definition video data and related commands may be connected to a standard HDMI device (such as, for example, a television or a monitor). However, embodiments of the invention are not limited to any particular type of data or device.

In some embodiments, a device is a mobile device utilizing an MHL™ (Mobile High-Definition Link™) compatible connection. While embodiments of the invention are not limited to any particular technology, MHL protocol may utilize a 5 or 6 pin interface that carries audio, video, and auxiliary data between a source device and a sink device. In some embodiments, separate mechanisms may be utilized on the source device and on the sink device to detect connectivity to each other.

In some embodiments, an interface may be presented via an MHL-specific connector or may be presented via standard connectors. Described below are a system and method of detecting connectivity to an MHL compatible sink device if the interface is an MHL-specific connector, and a system or method for distinguishing an MHL sink from other possible connections to a standard connector, which may include, but are not limited to, USB™ (Universal Serial Bus) compatible connectors such as micro-USB or mini-USB compatible connectors.

In some implementation, an MHL compatible interface may provide three signal pins (MHL+, MHL−, and control bus CBUS), a power pin (VBUS at +5V), and ground pins as provided in Table 1:

TABLE 1

Pin Connections

| PIN | Signal Assignment |
|-----|-------------------|
| 1 | +5 V (VBUS) |
| 2 | MHL− |
| 3 | MHL+ |
| 4 | CBUS |
| 5 | MHL GND |
| Shell | Power GND |

In some embodiments, the control bus (CBUS) provides a mechanism for a source device or a sink device to discover connectivity to an MHL-compliant sink device and source device, respectively. In some embodiments, the control bus is a single wire (one-bit), bi-directional control bus. In some embodiments, there is a different discovery mechanism provided for the source and sink devices.

In some embodiments, a discovery system utilizes the control bus CBUS pin to detect a connection, and utilizes the voltage bus VBUS pin to detect a disconnection at the source. FIG. 1 illustrates an embodiment of detection of connections utilizing a control bus. In this illustration, a control bus CBUS 115 and a power or voltage bus VBUS 120 are connected and provide an interface between an MHL compatible source device 105 and an MHL compatible sink device 110 in an MHL system. While the current illustration includes MHL technology, embodiments are not limited to this technology. Prior to the connection and discovery process, the source device 105 pulls the CBUS 115 high because of a pullup device or element, illustrated here as a 10 KΩ resistive pullup 125 connected to voltage source $V_{CBUS}$ 140. The sink device 110 pulls the CBUS 115 low due to a switched pulldown device or element, illustrated as a 1 KΩ termination 130 connected to a ground potential 140 switched by switch 170. The sink device 110 may further include a second pulldown device or element 135 with a larger impedance than the first pulldown device or element 130, illustrated as a 100 KΩ resistive element also connected to ground potential. Also illustrated are CBUS drivers 150 and 155 for the source device 105 and the sink device 110, respectively, to drive signals on the control bus 115. The VBUS 120 links a power source 160 via a switch 175 of the sink device with a VBUS level detection element or function of source device 165.

Figure 2:
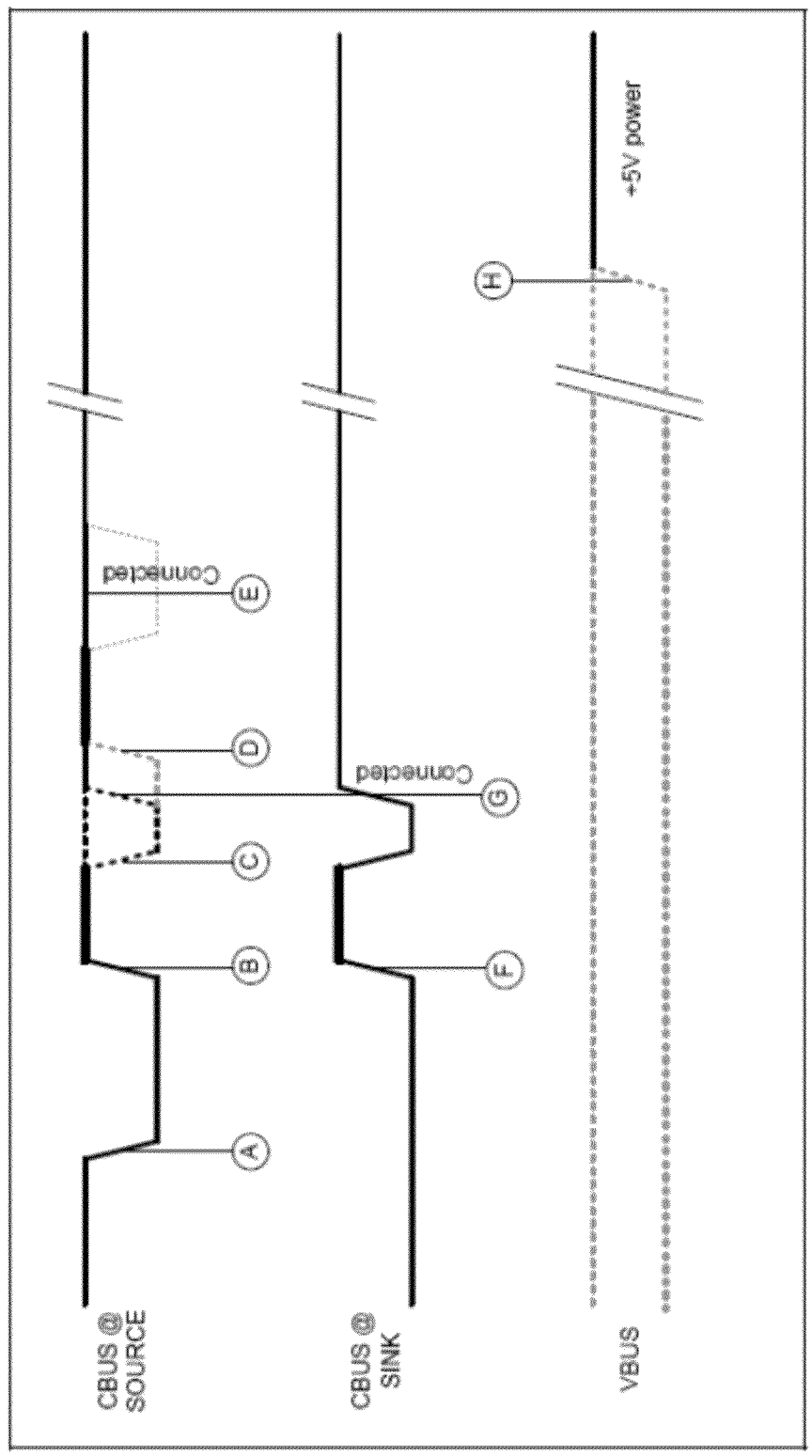
FIG. 2 illustrates an embodiment of a connection sequence for source and sink devices.

In some embodiments, source and sink devices may operate to discover connections, and may, for example, include an MHL compatible source and an MHL compatible sink discovering each other, such devices being connected by an MHL-specific connector or other standard connector. FIG. 2 illustrates an embodiment of a connection sequence for source and sink devices. In this illustration, a source device (such as source device 105 in FIG. 1) and a sink device (such as sink device 110 in FIG. 1) are connected via a link such as, for example, an MHL interface or cable, resulting in a connection sequence. The MHL cable may include a control bus and a voltage bus (such as CBUS 115 and VBUS 120 illustrated in FIG. 1).

In some embodiments, upon connection of the source device and the sink device, at the source device the CBUS transitions from a high state to a low state due to operation of a pulldown device or element, such as the 1 KΩ sink device termination 130 of the sink device in FIG. 1. The source device detects this transition (A) and responds by repeatedly driving the CBUS high (B) and allowing the potential of the CBUS to float (C→D). The time period during which the source device floats the CBUS is the source device's "detection window".

In some embodiments, the sink device in turn detects the high value on the CBUS and responds (F) by turning off the 1 KΩ sink termination, leaving on its 100 KΩ pulldown (G). The sink device now transitions to an MHL-connected state.

In some embodiments, the source device detects that the CBUS stays high during its detection window, and stops pulsing the CBUS (E). The source now transitions to a connected state.

In some embodiments, if the source device does not sense a high value on the CBUS during its detection window within a certain time after the source device commences pulsing the CBUS, the source device will stop pulsing and remain in a disconnected state. At this point, the source device will not attempt a re-discovery unless the source device detects another high-to-low transition on the CBUS.

Once both the source device and the sink device are in an MHL-connected state, the devices are ready to begin communicating via the interface between the devices.

In the illustrated sequence shown in FIG. 2, the state of the VBUS is not defined prior to the sink entering the MHL-connected state (G). In some embodiments, the sink device will drive VBUS to a high state (G→H) after the sink device transitions to an MHL-connected state.

Figure 3:
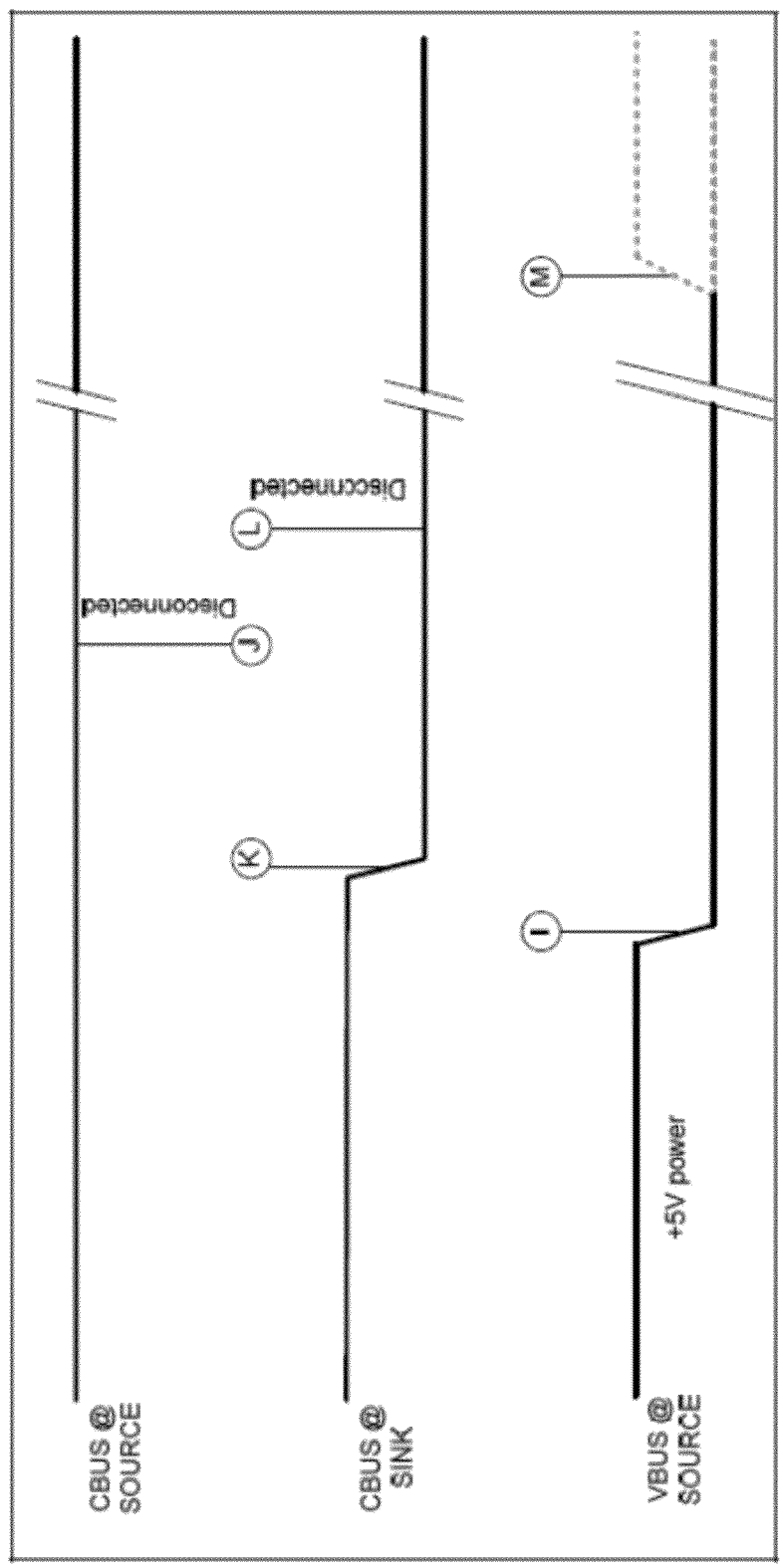
FIG. 3 illustrates an embodiment of a disconnection sequence for connected source and sink devices.

FIG. 3 illustrates an embodiment of a disconnection sequence for connected source and sink devices. In this illustration, a source device (such as source device 105 in FIG. 1) monitors the state of its VBUS pin (VBUS 120 and VBUS level detect 165) and transitions to a disconnected state whenever VBUS goes low for a certain time period (I→J). The sink device monitors the state of its CBUS pin and transitions to a disconnected state whenever CBUS goes low for longer than a particular time period, such as time period that normally occurs during CBUS communication (K→L). The sink device then turns off VBUS power (L→M) after transitioning to a disconnected state.

In some embodiments, devices may operate to discover connections, and may, for example, include an MHL compatible source utilizing an industry standard connector. For example, MHL signals may be presented via a standard connector such as a micro-USB or mini-USB connector. In this description, a micro-USB connector is described as example. However, embodiments of the invention may include any type of connector.

The USB protocol uses the ID signal as a means of discovering whether the USB device is operating as a host or as a peripheral. In addition, a number of USB accessories also use the USB ID signal as a means of identifying themselves to a USB device. In some embodiments, a discovery mechanism for MHL protocol functions in this ecosystem to identify an MHL compatible sink and differentiate such elements from USB compatible devices or accessories.

Figure 4:
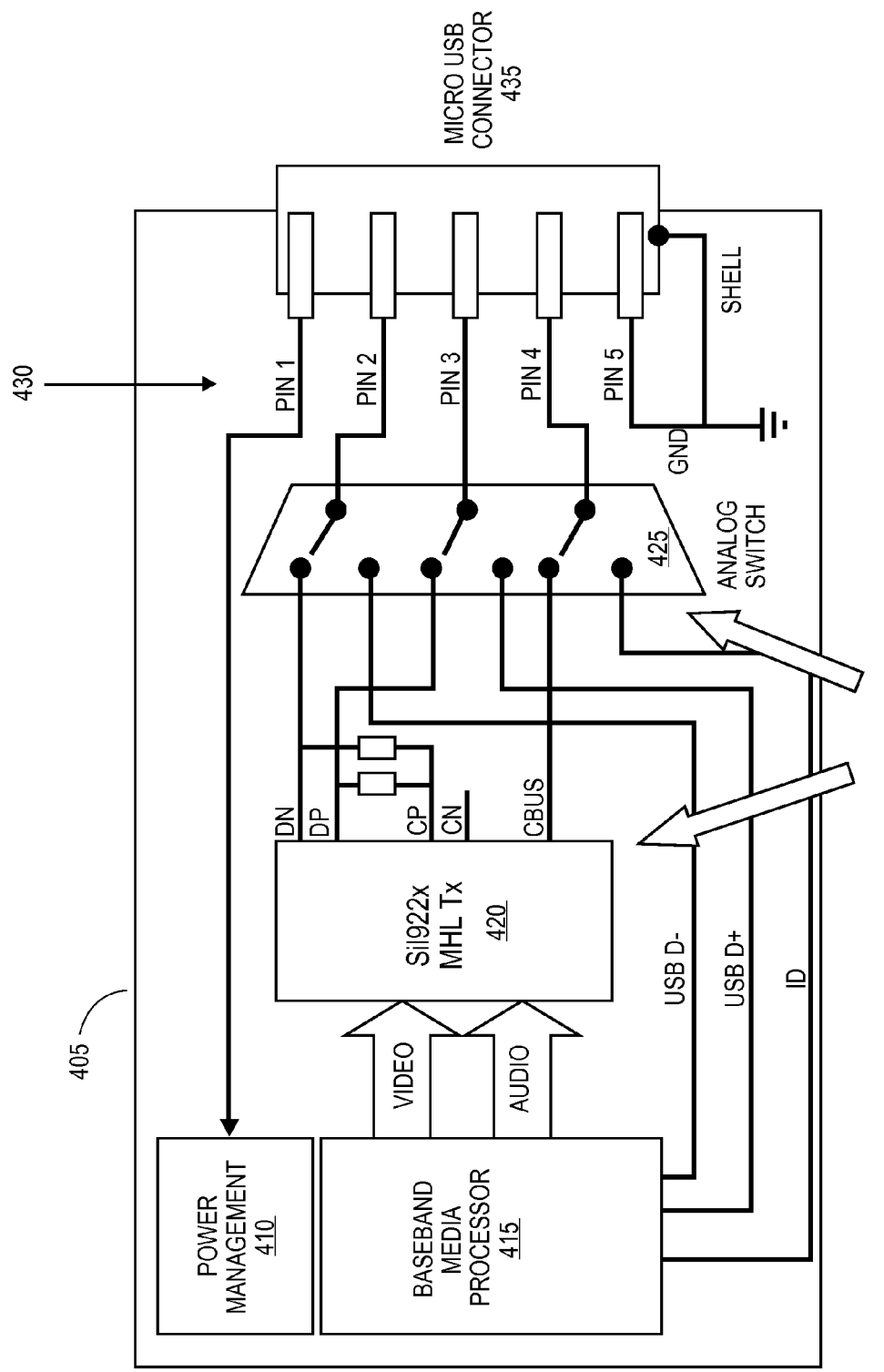
FIG. 4 illustrates an embodiment of a source apparatus or system including a switch mechanism for establishing connections.

In some embodiments, a source device may detect an existence and type of a sink device, and switch according to the type of sink device. In some embodiments, an MHL device using a USB compatible connector conceptually includes an analog switch that can switch between MHL mode and USB mode, or other such switching mechanism. FIG. 4 illustrates an embodiment of a source apparatus or system including a switch mechanism for establishing connections. FIG. 4 provides an example of a mechanism using discrete chips. However, embodiments are not limited to any particular apparatus, and the function of the switch mechanism may be implemented using, for example, an integrated MHL transmitter and analog switch.

In this illustration, a source device 405 includes an MHL transmitter 420 in an MHL subsystem of the source device 405. As illustrated, the MHL transmitter receives audio and video data from a baseband media processor 415, and the apparatus may provide either MHL mode data (a first mode) or USB mode data (a second mode) depending on the state or setting of an analog switch 425, which is then linked via a connector, illustrated as a micro-USB connector 435, to provide an interface with a sink device. Also illustrated is power management module 410.

In this implementation, the CBUS from the MHL transmitter is mapped to pin 4 of the micro-USB connector, which is the pin that would carry the USB ID signal in USB mode operation. In some embodiments, the USB ID pin is used to identify whether a USB device (host or peripheral) or accessory is connected to the micro-USB connector 435. This may be commonly done by measuring a resistance presented by the ID signal to the USB subsystem. A large range of possible ID resistances is in use, ranging from, for example, less than 10Ω to over 100 KΩ. In some embodiments, a resistance of an MHL sink may be defined to be approximately 1 KΩ when the sink element is in a disconnected state, which is a value that would fall within ranges of allowable ID impedances of a number of types of elements. For this reason, the identification of the resistance may not clearly identify a type of connected device. In some embodiments, a discovery process is provided to unambiguously detect an MHL device under these conditions.

In some embodiments, the switch 425 is in USB mode by default. The switch 425 may include a pull-up element (not shown in FIG. 4) of a high value, such as, for example, 1 MΩ, on pin 4. Hence, the ID signal is at a logical high when the micro-USB connector is disconnected.

In some embodiments, a discovery sequence or mechanism is provided to allow for detecting an MHL device, including:

(1) If an MHL sink device is connected to an MHL cable at the connector 435, there will be approximately a 1 KΩ impedance at the other end of the cable, causing, in this illustration, pin 4 of FIG. 4 to transition to a logical low.

(2) The transition of pin 4 to the logical low is used as a trigger to transition the switch 425 to MHL mode, in which the MHL subsystem (MHL transmitter 420, in this illustration) of the system 405 is selected to establish an MHL source. This transition to MHL mode exposes the CBUS for the MHL source to a logical low, allowing for the discovery process (as described above) to be carried out.

(3) After a certain time duration, the MHL source is queried to check for connectivity to an MHL sink via the connector 435.

(3a) If connectivity exists to an MHL sink, the switch 425 stays in MHL mode.

(3b) If there is no connectivity to an MHL sink, the switch 425 transitions to USB mode, allowing a usual USB device discovery process to commence. At this point the switch 425 enters a lockout period, during which the source 405 ignores any further transitions on pin 4.

(4) The switch 425 is locked to MHL mode if the MHL sink is in an MHL-discovered state. The switch is locked to USB mode if the USB subsystem indicates that it is connected to a USB device or accessory.

(5) The switch 425 transitions back to USB mode if the MHL sink indicates that it is in a disconnected state.

Figure 5:
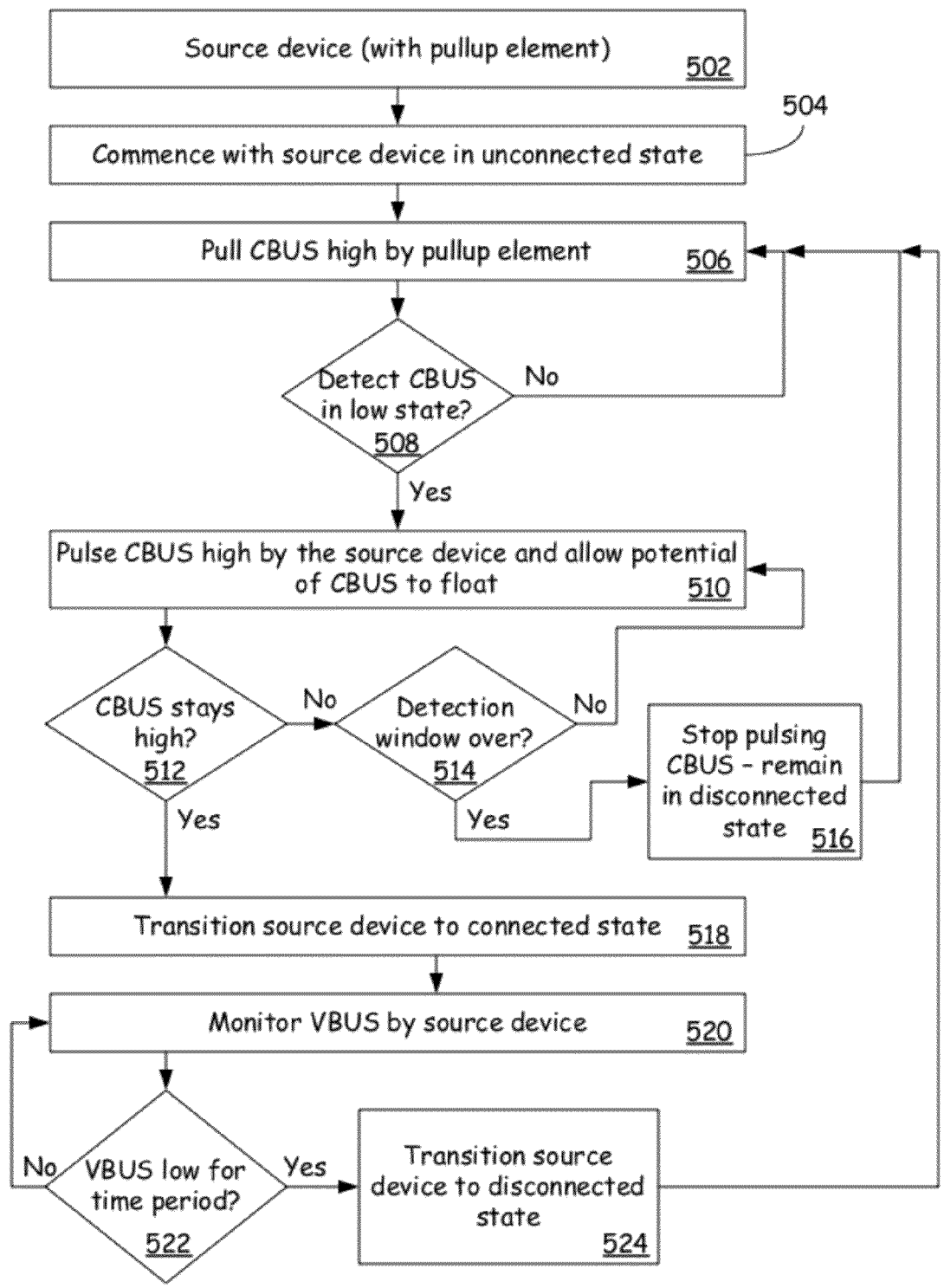
FIG. 5 is a flow chart to illustrate an embodiment of discovery of a connection for a source element.

FIG. 5 is a flow chart to illustrate an embodiment of discovery of a connection for a source element. In this illustration, a source device with a pullup element 502 may operate to detect connection with a second device, such as a sink device having a pulldown element, with the source device assumed to commence in an unconnected state 504. The source device will tend to pull a control bus CBUS high because of the operation of the pullup element 506.

In some embodiments, if the source device detects that CBUS is in a low state 508, then the source device will commence pulsing the CBUS high and allowing the CBUS to float 510, the pulsing to provide a signal to a connected sink device to respond on the CBUS. In some embodiments, if the source device detects that the CBUS remains high 512, this is indicative of a sink device response, and the source device is transitioned to a connected state 518. In some embodiments, if the source device has not detected that the CBUS has remained high 512 and a detection window or time period has elapsed 514, then the source device ceases pulsing the CBUS and the source device remains in a disconnected state 516.

In some embodiments, after transitioning to the connected state, the source device monitors a voltage bus VBUS for evidence of a disconnect 520. If the VBUS remains in a low state for a certain time period 522, this is indicative of the sink device being disconnected from the source device 524.

Figure 6:
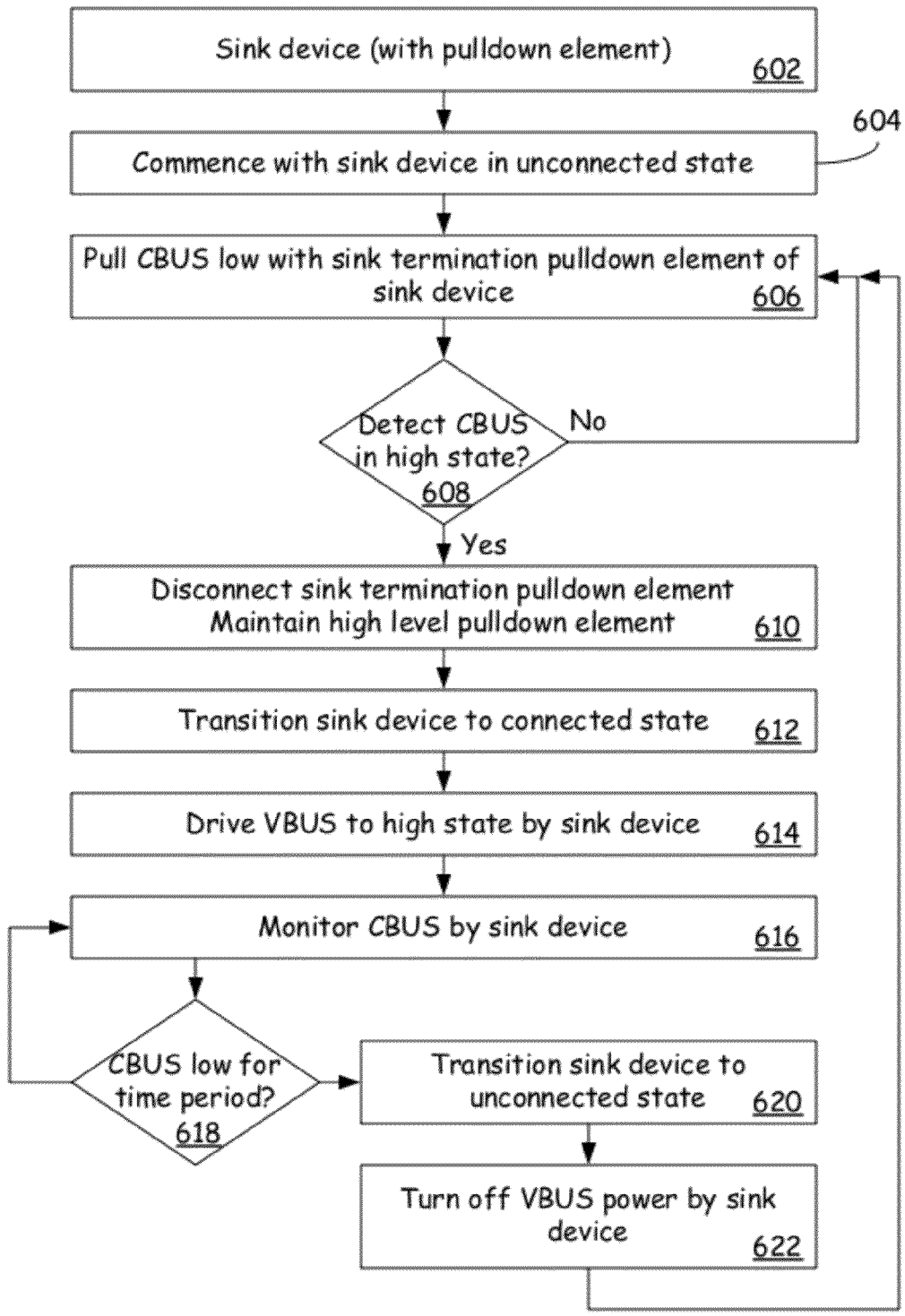
FIG. 6 is a flow chart to illustrate an embodiment of discovery of a connection for a sink element.

FIG. 6 is a flow chart to illustrate an embodiment of discovery of a connection for a sink element. In this illustration, a sink device with a pulldown element 602 may operate to detect a connection with a second device, such as a source device having a pullup element, with the sink device assumed to begin in an unconnected state 604. The sink device will tend to pull a control bus CBUS low because of the operation of the pulldown element 606. In some embodiments, the sink device includes a first pulldown element having a relatively small impedance value (which may be referred to as a sink termination element) that is switchable and a second pulldown element having a relatively high impedance value.

In some embodiments, if the sink device detects the CBUS in a high state 608, indicative of a source device pulsing the CBUS high, then the sink device disconnects the sink termination element, and maintains the second high value pull-down element 610. The sink device then transitions to a connected state 612, and drives a voltage bus VBUS high 614.

In some embodiments, the sink device monitors the CBUS 616. Upon detecting that the CBUS remains low for a certain time period 618, indicative of a disconnect from the source device, the sink device transitions to an unconnected state 620 and turns off the VBUS power 622.

Figure 7:
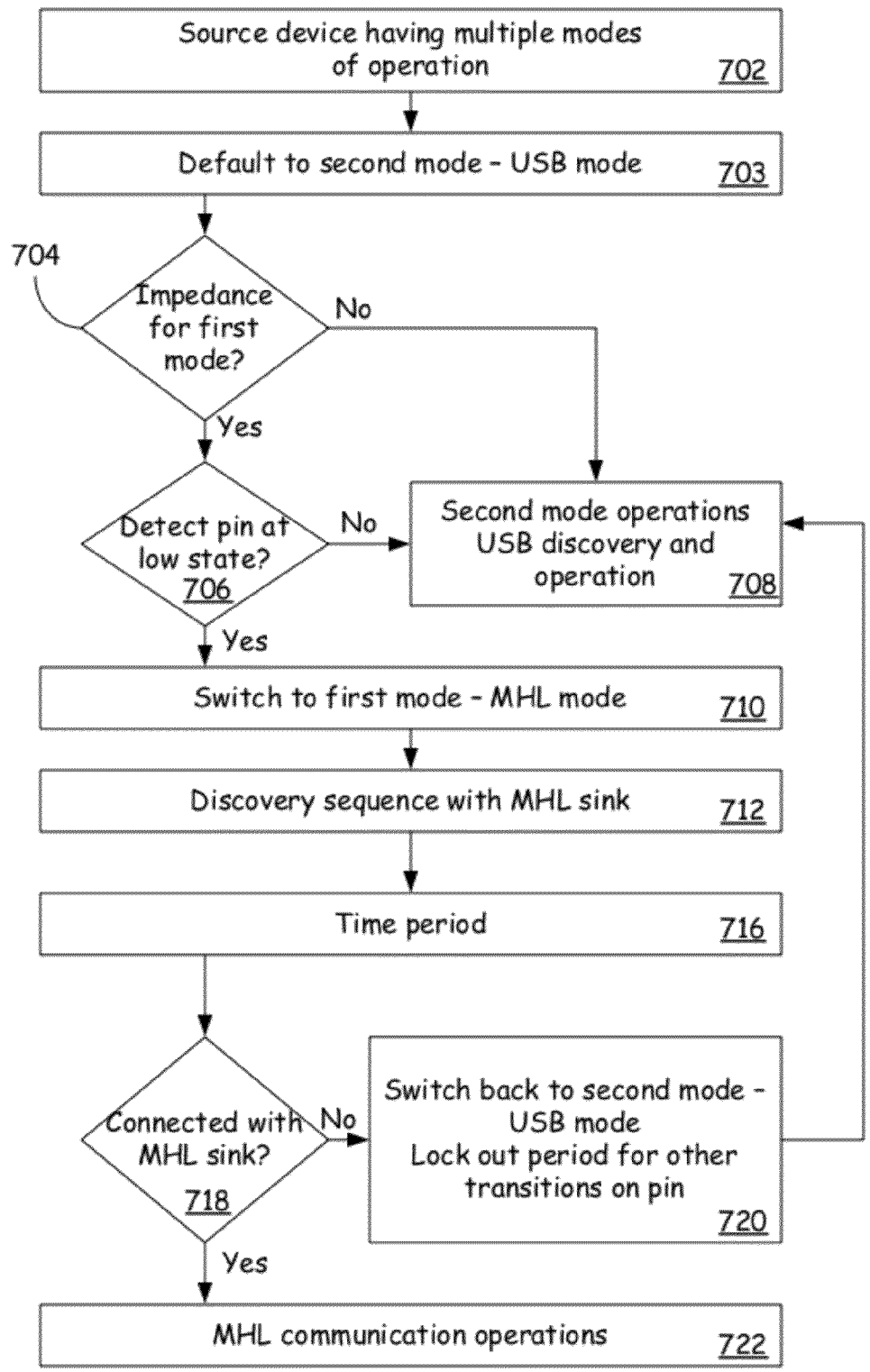
FIG. 7 is a flow chart to illustrate an embodiment of detection of a type of sink device connected to a source device or system.

FIG. 7 is a flow chart to illustrate an embodiment of detection of a type of sink device connected to a source device or system. In some embodiments, a source device having multiple modes of operation 702, such as a first MHL mode and a second USB mode, may operate to detect a type of sink device connected to the source device. In some embodiments the source device operates to switch to an appropriate mode for the attached sink device.

In some embodiments, a source device defaults to the second mode, such as defaulting to a USB mode 703. If an impedance connected to the source device is consistent with a first mode device 704, such as an impedance of approximately 1K ohms for an MHL compatible device, a determination may be made whether the source device detects a certain pin is at a low state 706, such as pin 4 in FIG. 4, that is utilized for USB discovery in a USB mode and CBUS operation in MHL mode. If so, the source device switches to a first mode, such as switching to an MHL mode 710. If the connected impedance is not consistent with the first mode or a low state for the pin is not detected, the source device continues with operation in the second mode, such as standard USB discovery and operations 708.

Upon switching to the first mode, the source device may proceed with a discovery sequence 712, such as the sequence illustrated in FIG. 5. After a certain time period has elapsed 716, the source device is queried with regard to whether the source device is connected with a first mode compatible sink device, such as an MHL compatible device 718. If so, the source device may continue to conduct communication operations in the first MHL mode 722. If the source device is not connected to a first mode compatible device, and thus the detected low state on the pin was not actually indicative of an MHL connection, then the source device may switch back the second USB mode 722. In some embodiments the source device may enter a lock out period during which state transitions on the pin are ignored.

Figure 8:
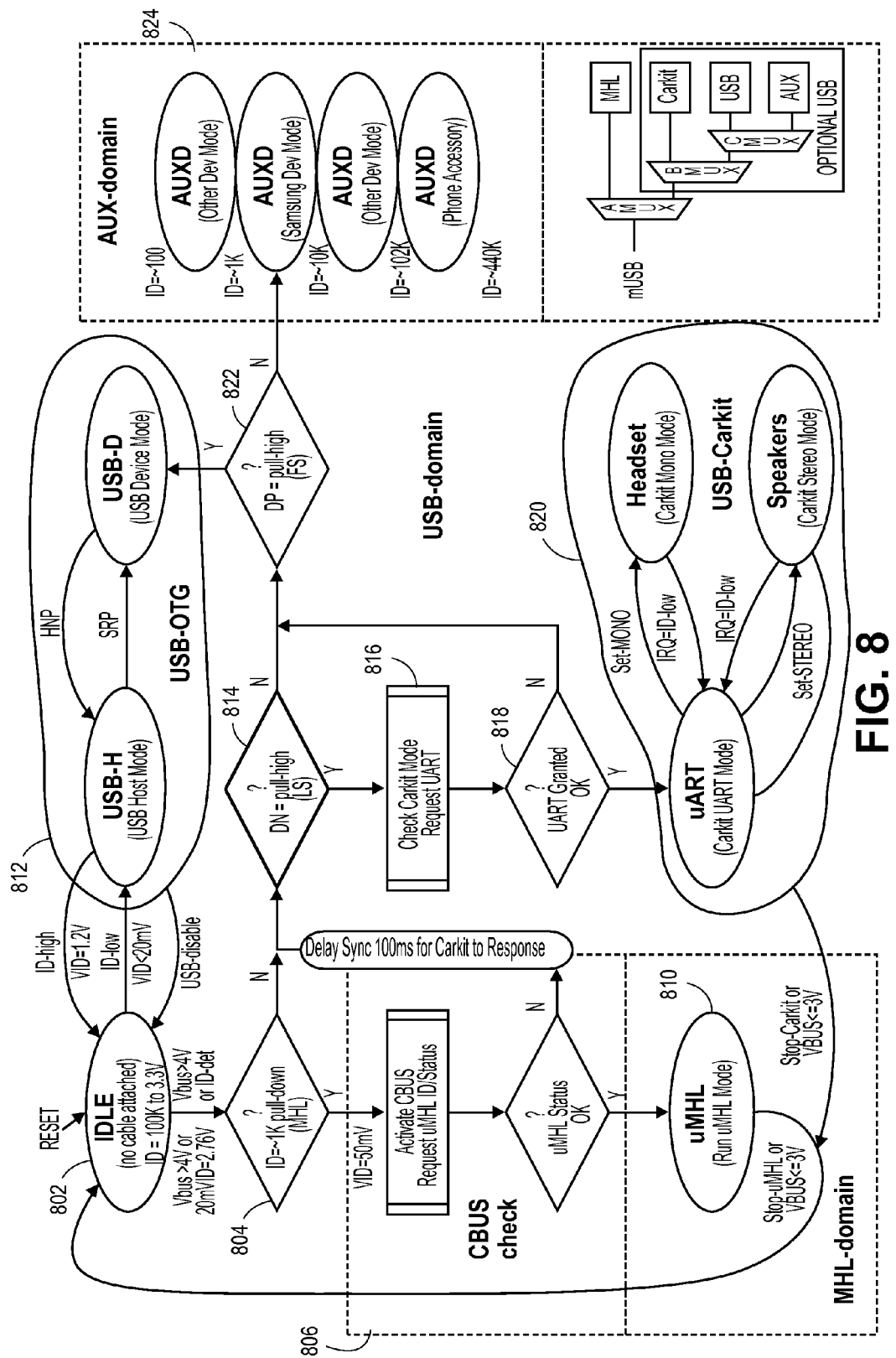
FIG. 8 is a state transition diagram to illustrate an embodiment of a discovery sequence.

FIG. 8 is a state transition diagram to illustrate an embodiment of a discovery sequence. This illustration specifically describes a USB connection, but the described mechanism is not limited to any particular connection, and may provide for discovery of MHL utilizing any other connectors.

As shown in FIG. 8, a system may include an MHL domain (a first mode domain), a USB domain (a second mode domain), and an auxiliary domain. In this illustration, a system may be in an idle or reset state with no cable connection 802. In some circumstances (an ID low state), the system may transition to a USB-OTG (USB On-The-Go) mode 812, from which it may return to the idle state. Upon a certain VBUS state, there is a determination whether on impedance on an ID pin is approximately 1 KΩ, indicative of or consistent with an MHL device 804. If so, the system may proceed to a control bus check 806, including activation of the CBUS and request for MHL ID/status. In some embodiments, the process includes a discovery sequence as described herein, such as the sequences illustrated in FIGS. 5 and 6. If the check is successful, the system proceeds to operate in MHL mode 810.

If the connected impedance is not indicative of an MHL device 804 or the CBUS check 806 is not successful, there may be a determination whether a DN signal is pulled high 814. If so, there may be a carkit mode check and UART (universal asynchronous receiver/transmitter) mode request 816. If the UART request is granted 818, the system may continue with USB carkit operation 820. If DN is not pulled high 814 or UART is not granted 818, then there is a determination whether a DP signal is pulled high 822. If so, the system enters the USB-OTG mode, and if not the system enters an auxiliary mode.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A method comprising:
   detecting a transition of a control bus from a high state to a low state by a source device, the source device being configured to be coupled with a sink device via an interface, the interface including the control bus and a voltage bus, the source device including a resistive pullup device to be connected to the control bus and the sink device including a resistive pulldown device to be connected to the control bus;
   upon detecting by the source device of the transition of the control bus from the high state to the low state, pulsing the control bus to the high state at the source device;
   upon detecting by the source device that the control bus remains in the high state after pulsing of the control bus to the high state, the control bus remaining in the high state as a result of the sink device disconnecting the resistive pulldown device, then:
      ceasing the pulsing of the control bus to the high state, and
      transitioning the source device from a disconnected state to a connected state; and
   upon the source device detecting that a power source on the voltage bus is disabled for a certain time period while the source device is in the connected state, the source device transitioning from the connected state back to the disconnected state.

2. The method of claim 1, further comprising:
   upon transitioning the source device to the connected state, querying by the source device for connectivity of the source device to the sink device;
   if connectivity to a sink device exists, the source device remaining in the connected state; and
   if no connectivity to a sink device exists, returning the source device to the disconnected state for a time period.

3. The method of claim 1, further comprising:
   upon failing to sense a high state on the control bus within a certain time after commencing pulsing the control bus:
      ceasing pulsing of the control bus by the source device; and
      maintaining the source device in the disconnected state.

4. A method comprising:
   pulling a control bus potential to a low state at a sink device by a resistive pulldown device of the sink device, the sink device being configured to be coupled with a source device via an interface, the interface including the control bus and a voltage bus, the source device including a resistive pullup device;
   detecting a high state of the control bus at the sink device, wherein the detected high state of the control bus is a result of a pulsing of the control bus to the high state by the source device; and
   in response to the detection of the high state on the control bus by the sink device, the sink device operating to:
      disconnect the resistive pulldown device,
      transition to a connected state, and
      enable a power source to the voltage bus upon transitioning to the connected state; and
   detecting by the sink device the control bus transitioning to the low state and remaining in the low state for longer than a certain time period while the sink device is in the connected state, the sink device to then transition from the connected state to the disconnected state and disable the power source on the voltage bus.

5. An apparatus comprising:
   an interface for coupling with a second apparatus, the interface including a control bus and a power bus;
   a resistive pullup device coupled with the control bus; and
   a driver to drive a signal on the control bus;
   wherein the apparatus is configured to detect a transition of the control bus from a high state to a low state and the driver is configured to pulse the control line to a high state upon the detection of the control bus transitioning from the high state to the low state;
   wherein, upon the apparatus detecting that the control bus remains in the high state after a pulse of the control bus to the high state, the driver is to cease pulsing the control line to the high state and the apparatus is to transition from a disconnected state to a connected state; and
   wherein, upon the apparatus detecting that a voltage on the power bus is disabled for a certain time period while the apparatus is in the connected state, the apparatus is to transition from the connected state back to the disconnected state.

6. The apparatus of claim 5, wherein the apparatus is a source device and the second apparatus is a sink device, the apparatus to provide a stream of data to the second apparatus.

7. An apparatus comprising:
   an interface for coupling with a second device, the interface including a control bus and a power bus;
   a first resistive pulldown device and a second resistive pulldown device coupled with the control bus, the first resistive pulldown device being switchable; and
   a driver to drive a signal on the control bus;
   wherein the apparatus is configured to detect that the control bus is in a high state, the detected high state of the control bus being a result of a pulsing of the control bus to the high state by the second device, and, in response to the control bus being in the high state, the apparatus is to switch off the first resistive pulldown device, to transition the apparatus to a connected state, and to enable a voltage on the power bus; and
   wherein the apparatus is further configured to transition from the connected state to an unconnected state and to disable the voltage on the power bus upon detecting that the control bus remains in a low state for longer than a certain time period while the apparatus is in the connected state.

8. The apparatus of claim 7, wherein the apparatus is a sink device and the second apparatus is a source device, the apparatus to receive data from the second apparatus.

9. The apparatus of claim 5, further comprising:
a first mode subsystem, the first mode subsystem including a first mode transmitter;
a second mode subsystem;
a switch coupled to the first mode subsystem and the second mode subsystem; and
a connector for coupling the apparatus with the second apparatus via the interface, the switch being configured to include a first setting to connect the first mode subsystem with a connector and a second setting to connect the second mode portion with the connector, the connector including a plurality of pins;
wherein the apparatus is configured to detect an impedance of the apparatus at a first pin of the connector and a voltage state at the first pin;
wherein, upon the apparatus detecting an impedance that is consistent with an apparatus of the first mode and upon detecting the first pin at a low state, the apparatus is configured to set the switch at the first setting.

10. The apparatus of claim 9, wherein the first mode is configured to follow a discovery sequence for determination whether to transition to the connected state upon the switch being set at the first setting.

11. The apparatus of claim 10, wherein the apparatus is configured to check whether the first mode subsystem is connected to an apparatus of the first mode after a certain time period has expired, and, upon determining that the first mode subsystem is not connected to an apparatus of the first mode, the apparatus is configured to change the switch from the first setting to the second setting.

12. The apparatus of claim 9, wherein the switch is configured to default to the second setting.

13. The apparatus of claim 9, wherein the first mode subsystem is a subsystem compatible with MHL™ (Mobile High-Definition Link™) protocol.

14. The apparatus of claim 9, wherein the second mode subsystem is a subsystem compatible with USB™ (Universal Serial Bus) protocol.

15. The apparatus of claim 14, wherein the connector is micro-USB or mini-USB compatible connector.

16. A method comprising:
pulling a control bus potential to a low state at a sink device by a resistive pulldown device of the sink device, the sink device being coupled with a source device via an interface, the interface including the control bus and a voltage bus;
detecting transition of the control bus from a high state to the low state by the source device, the source device including a resistive pullup device to be connected to the control bus;
upon detecting by the source device of the transition of the control bus from the high state to the low state, pulsing the control bus to the high state at the source device;
detecting the high state of the control bus at the sink device caused by the pulsing of control bus, the sink device then:
disconnecting the resistive pulldown device,
transitioning the sink device to a connected state, and
enabling a power source to the voltage bus upon transitioning to the connected state; and
detecting by the source device that the control bus remains in the high state after pulsing of the control bus to the high state, the control bus remaining in the high state as a result of the sink device disconnecting the resistive pulldown device, the source device then:
ceasing the pulsing of the control bus to the high state, and
transitioning the source device from a disconnected state to a connected state.

17. The method of claim 16, wherein upon the source device detecting that a power source on a voltage bus is disabled for a certain time period while the source device is in the connected state, the voltage bus being a part of the interface between the source device and the sink device, the source device transitioning from the connected state back to the disconnected state.

18. The method of claim 16, wherein upon the sink device detecting the control bus transitioning to the low state and remaining in the low state for longer than a certain time period while the sink device is in the connected state, the sink device then transitioning from the connected state to the disconnected state and disabling the power source on the voltage bus.

19. A system comprising:
a first apparatus including:
an interface for coupling with a second apparatus, the interface including a control bus and a power bus;
a resistive pullup device coupled with the control bus; and
a first driver to drive a signal on the control bus; and
a second apparatus including:
an interface for coupling with the first device;
a first resistive pulldown device and a second resistive pulldown device coupled with the control bus, the first resistive pulldown device being switchable; and
a second driver to drive a signal on the control bus;
wherein:
the first apparatus is configured to detect a transition of the control bus from a high state to a low state and the first driver is configured to pulse the control line to a high state upon the detection of the control bus transitioning from the high state to the low state, and
upon the first apparatus detecting that the control bus remains in the high state after a pulse of the control bus to the high state, the first driver is to cease pulsing the control line to the high state and the first apparatus is to transition from a disconnected state to a connected state; and
wherein the second apparatus is configured to detect that the control bus is in a high state, the detected high state of the control bus being a result of a pulsing of the control bus to the high state by the first device, and, in response to the control bus being in the high state, the apparatus is to switch off the first resistive pulldown device, to transition the apparatus to a connected state, and to enable a voltage on the power bus.

20. The system of claim 19, wherein upon the first apparatus detecting that a voltage on the power bus is disabled for a certain time period while the first apparatus is in the connected state, the first apparatus is to transition from the connected state back to the disconnected state.

21. The system of claim 19, wherein the second apparatus is further configured to transition from the connected state to an unconnected state and to disable the voltage on the power bus upon detecting that the control bus remains in a low state for longer than a certain time period while the second apparatus is in the connected state.

* * * * *